United States Patent [19]
Behrens

[11] Patent Number: 5,551,266
[45] Date of Patent: Sep. 3, 1996

[54] MANUAL TRANSMISSION SHIFTER TO IGNITION INTERLOCK

[75] Inventor: William L. Behrens, Ortonville, Mich.

[73] Assignee: Chrysler Corporation, Highland Park, Mich.

[21] Appl. No.: 445,482

[22] Filed: May 22, 1995

[51] Int. Cl.⁶ .............................. B60R 25/06; E05B 65/12
[52] U.S. Cl. ................. 70/247; 70/193; 70/248; 74/477; 74/475
[58] Field of Search ........................... 70/245, 247, 248, 70/252, 256, 257, 193, 201, 202, 249; 74/475, 477

[56] References Cited

U.S. PATENT DOCUMENTS

| | | |
|---|---|---|
| 1,352,489 | 9/1920 | Whitt . |
| 3,566,634 | 3/1971 | Borck . |
| 3,590,613 | 7/1971 | Kimberlin . |
| 3,998,109 | 12/1976 | O'Brien ........................ 74/475 |
| 4,270,624 | 6/1981 | Jessop . |
| 4,474,085 | 10/1984 | DeVogelaere et al. ........... 70/248 |
| 4,671,085 | 6/1987 | Yamaguchi et al. . |
| 4,693,135 | 9/1987 | LaRocca et al. . |
| 4,884,423 | 12/1989 | Fancher . |
| 4,912,997 | 4/1990 | Malcolm et al. ................. 74/475 |
| 4,932,283 | 6/1990 | Ishigami et al. ................. 74/477 |
| 4,959,982 | 10/1990 | Mauz et al. . |
| 4,967,883 | 11/1990 | Kito et al. ........................ 70/248 |
| 5,078,242 | 1/1992 | Ratke et al. ..................... 70/248 |
| 5,085,096 | 2/1992 | Behrens ............................ 74/477 |
| 5,251,723 | 10/1993 | Rolinski et al. ................. 70/248 |
| 5,277,077 | 1/1994 | Osborn ............................. 74/475 |

*Primary Examiner*—Darnell M. Boucher
*Attorney, Agent, or Firm*—Thomas G. Pasternak

[57] ABSTRACT

A floor mounted manually operable shifter assembly for use with a vehicle manual transmission having a gear shifter selectively pivotal to a plurality of positions about longitudinal and transverse axes. The gear shifter assembly base has a pivotally mounted bellcrank lever, including an upstanding first arm and a rearwardly extending dish-shaped second arm, defining an upwardly concave semi-spherical raceway formed with a reverse gear position notch. An end fitting, pivoted on the shifter lower end, is adapted to apply a clockwise pivoting force on the raceway during the shifter's rearward travel which force overrides an interlock cable core counter-clockwise biasing force on the bellcrank lever. During the end fitting's forward travel on the raceway the cable core biases the raceway into counterclockwise sliding contact with the end fitting. Upon the fitting being captured in the reverse gear notch, the bellcrank is at its forward limit position wherein rotation of an ignition lock cylinder to its key-release Lock mode results in the cable core locking the bellcrank lever, whereby the shifter end fitting is held in the reverse gear notch allowing the vehicle to be driven only in reverse gear.

10 Claims, 5 Drawing Sheets

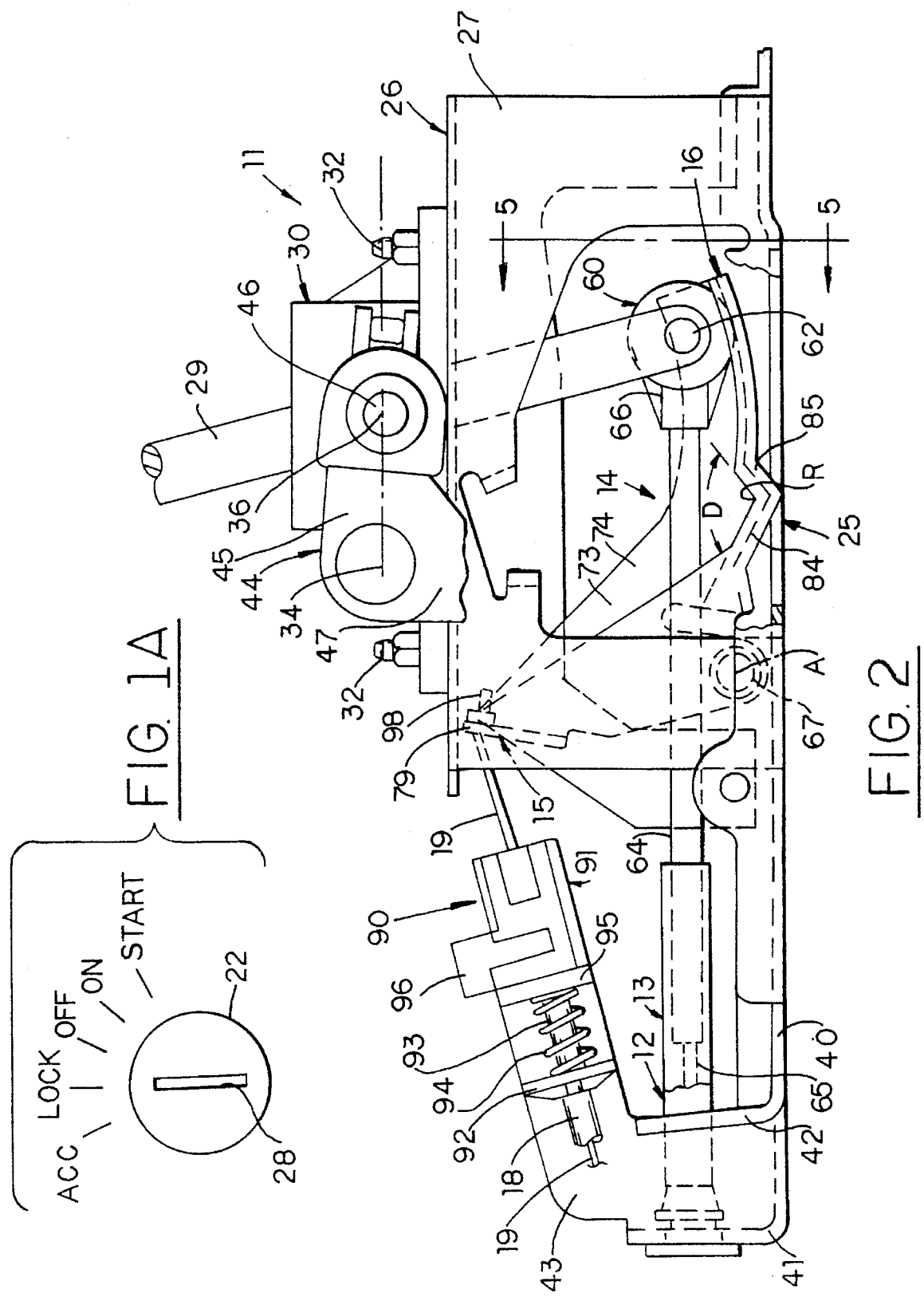

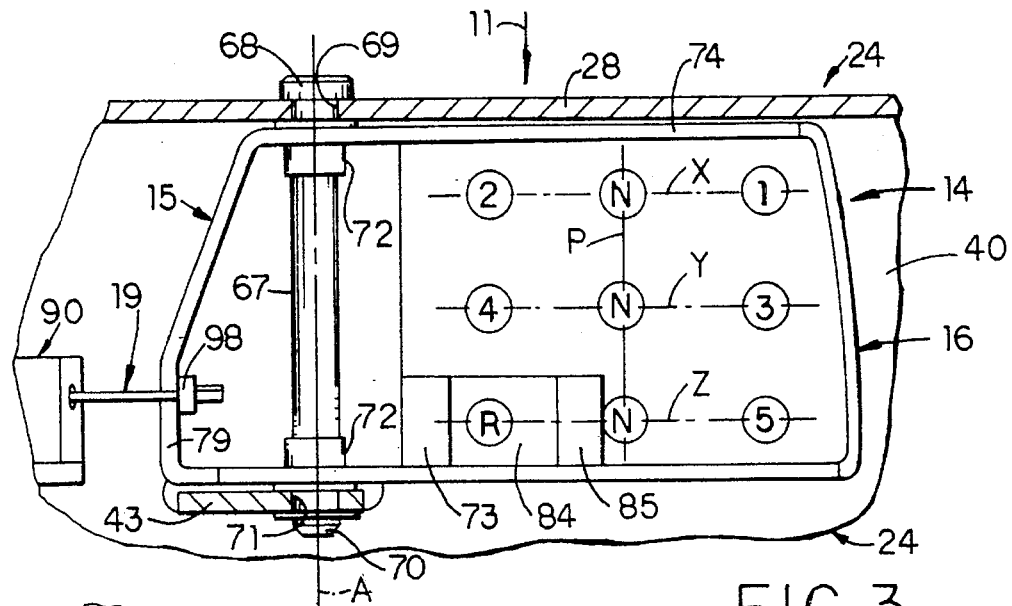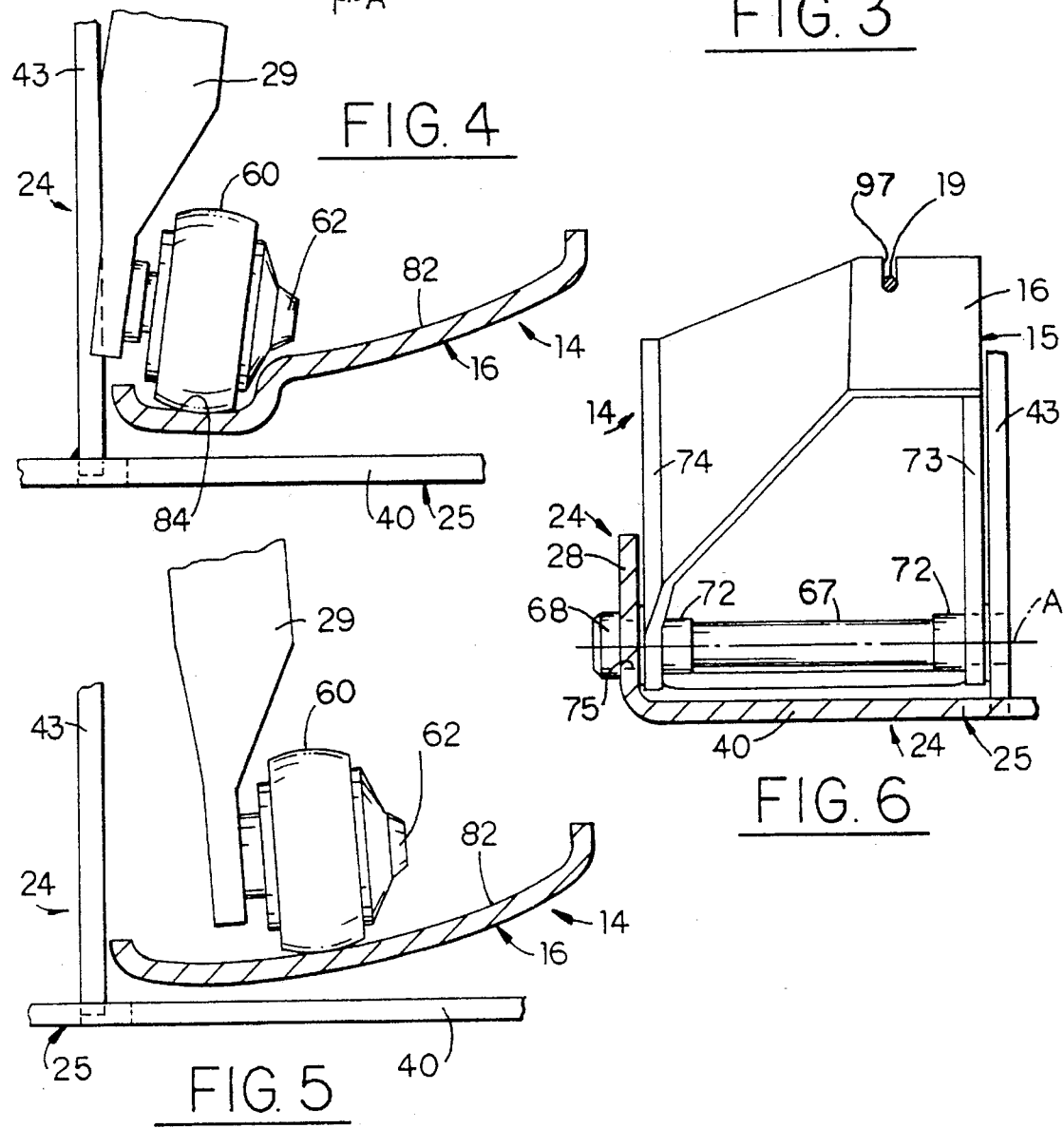

MANUAL TRANSMISSION SHIFTER TO IGNITION INTERLOCK

BACKGROUND OF THE INVENTION

This invention relates generally to gear shifter assemblies for motorized vehicle manual transmissions and more particularly, to an anti-theft interlock arrangement for locking the shifter in its reverse gear position.

It is known that conventional automatic transmissions are generally equipped with a steering lock arrangement having a shifter assembly movable between a Park mode position and a non-Park mode position which utilizes a key-operable switch including a housing mounted on a steering column and a keyway cylinder in the housing for rotational movement between positions corresponding to Lock and non-Lock modes of the switch. The lock assembly includes an interlock mechanism associated with the switch for locking the steering arrangement when and only when the keyway cylinder is in its Lock mode. The interlock mechanism is connected by a cable arrangement to the transmission shifter assembly for movement therewith.

It is further known to use anti-theft locks in connection with vehicle manual transmissions to provide means for locking the transmission gears in a reverse mode, whereby the vehicle can only be driven backward. U.S. Pat. No. 1,352,489, issued Sep. 14, 1920 to Whitt, entitled "Transmission Lock" discloses such a manual transmission locking arrangement.

SUMMARY OF THE INVENTION

It is a feature of the present invention to provide an anti-theft interlock arrangement for a vehicle manual transmission gear shifter assembly such that, with the gear shifter in reverse gear position and the ignition key cylinder switch in its key-release Lock mode, the shifter is locked in reverse position.

It is another feature of the present invention to provide an anti-theft interlock arrangement for a conventional cable-type manual transmission shifter assembly wherein the assembly may be modified, without major retooling, by mounting a unique bellcrank lever on the shifter assembly base for controlled forward and aft pivotal movement about a transverse axis in conjunction with an end fitting on the lower end of the shifter whereby, during shifting, the fitting traces an inverted shift pattern on a dish-shaped arm of the bellcrank lever.

It is yet another feature of the present invention to provide an anti-theft interlock arrangement for a vehicle manual transmission shifter assembly, as set forth above, wherein an automatic transmission type interlock cable assembly is operatively connected between an upstanding arm of the bellcrank lever and a key operated ignition switch cylinder on the steering column whereby, with the shifter in its reverse position, the end fitting is adapted to be locked by a notch in the bellcrank lever dish-shaped arm upon rotation of the key to its key-release Lock mode.

To achieve the foregoing features, the bellcrank lever includes an upstanding first arm and a rearwardly extending dish-shaped second arm providing an upwardly facing semi-spherical concave raceway. A push-pull cable core interconnects the bellcrank lever first arm with a spring-loaded slider of an ignition key cylinder and interlock assembly whereby, with the key cylinder moved to a key-retain position, the cable core biases the bellcrank lever to a forwardly pivoted reverse gear limit position. The shifter lower end has a shift cable end-fitting adapted to slidably contact the raceway tracing an inverted shift pattern thereon.

The end fitting exerts a downward force on the raceway during its rearward travel, overriding the cable core biasing force, thereby pivoting the bellcrank lever dish-shaped arm downwardly. During the end fitting's forward travel on the raceway, the core biases the raceway into sliding contact with the shifter end fitting. The raceway is formed with a reverse gear notch, adjacent to and aft of the bellcrank pivot axis, which is adapted to capture the end fitting in the shifter's reverse gear position. Concurrently with the operator moving the shifter to its reverse position, the cable core urges the bellcrank lever to its forward limit position, wherein the interlock slider is biased into its lock mode, allowing a key cylinder spring-loaded lock pin to radially extends into a slider pocket. Upon rotation of the key cylinder to its key-release Lock mode, the shifter is locked in its reverse gear position by virtue of its end fitting being held in the raceway notch. Thus, even if the ignition switch is bypassed, the shifter assembly interlock arrangement allows the vehicle to be driven only in reverse gear.

These and other features and advantages of the invention will be more fully understood from the following detailed description of the invention taken together with the accompanying drawings.

BRIEF DESCRIPTION OF THE DRAWINGS

In the drawings:

FIG. 1A is a diagrammatic view taken in the direction of arrow "1A" in FIG. 1;

FIG. 2 is a side view of the shifter assembly of FIG. 1 shown in its third gear position;

FIG. 3 is a fragmentary horizontal sectional view, partly in elevation, taken substantially on the line 3—3 of FIG. 1;

FIG. 4 is an enlarged fragmentary vertical sectional view, partly in elevation, taken substantially on the line 4—4 of FIG. 1;

FIG. 5 is a view similar to FIG. 4 taken substantially on the line 5—5 of FIG., 2;

FIG. 6 is a fragmentary horizontal sectional view, partly in elevation, taken substantially on the line 6—6 of FIG. 1;

DETAILED DESCRIPTION OF THE INVENTION

Figure 1:
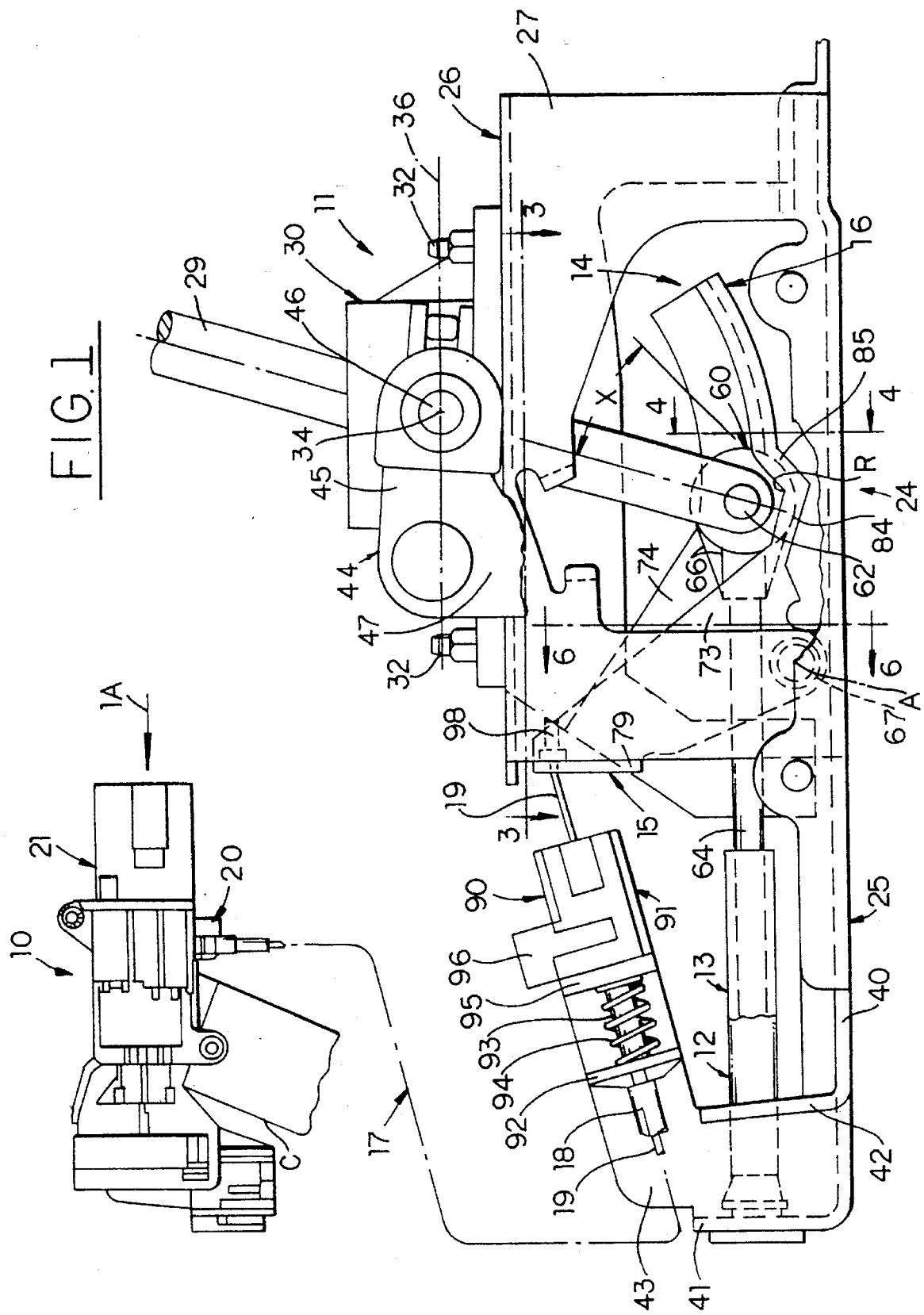
FIG. 1 is a fragmentary, partially diagrammatic, side view of a floor mounted manual transmission shifter assembly in its reverse gear locked position.

Referring now to the drawings, FIG. 1 shows an ignition key cylinder and interlock assembly, generally indicated at 10, and a vehicle floor mounted manual transmission shifter assembly, generally indicated at 11. These assemblies are interconnected, in accordance with the present invention, by a flexible interlocking cable 17. The cable 17 includes an outer sheath 18 surrounding an inner passageway through which a strand or core moves in a spring-loaded push-pull manner.

In the disclosed embodiment, the shifter assembly 11, which is a conventional cable type shifter assembly adapted for use with a remote vehicle transaxle (not shown), operates a push-pull actuator shift cable 12 side-by-side with a push-pull selector cable 13. Reference may be made to U.S. Pat. No. 4,639,135, issued Sep. 15, 1987 to La Rocca et al., for a detailed description of a typical cable manual gear shift mechanism.

The FIG. 1 cable shifter assembly 11 has been modified by the addition of a bellcrank lever 14 including an upstanding U-section first arm, generally indicated at 15, and a rearwardly extending dish-shaped second arm 16 connected at its upper end to one end the cable core 19. The other end of the interlock cable core is connected to an interlock mechanism 20 shown in FIG. 1 supported on a lock cylinder housing 21 arranged near the shifter assembly 11. In the disclosed form, the assembly 10 is shown secured to a vehicle steering column, partially indicated at "C" in FIG. 1.

As seen in FIG. 1A, a lock cylinder 22, which has a keyway 23 adapted to receive an ignition key (not shown), is rotatable to a Lock (key-release) position and a plurality of other non-Lock (key-retain) positions representing various functions including accessory "Acc", "Off", "On" and "Start" positions. Thus, when the key is rotated to any non-Lock position, the key cannot be pulled out of the cylinder keyway 23 because of the function of the interlock mechanism 20, to be described. The ignition key cylinder interlock assembly 10 is a conventional design used, for example, in combination with an automatic transmission floor mounted gear select mechanism steering lock arrangement.

The manual transmission gear shifting assembly 11 is shown in FIGS. 1 and 3. Assembly 11 includes a frame-like structure 24 of sheet metal construction having an elongated base 25, an upper support member 26, and side support members 27 and 28. A shifter 29 is mounted on the structure 24 by a ball and socket joint (not shown) located in a socket housing 30 secured to the upper support member 26 by bolts 32. The shifter 29 is pivotal to a plurality of positions about a first axis 34, extending transversely of the base, and a second axis 36, extending longitudinally of the base, wherein the second axis 36 is perpendicular to and intersects the first axis 34.

Referring to FIG. 1, the base 25 includes a longitudinally extending base plate 40, formed with an upstanding right front flange portion 41, which supports the gear shifting cable 12, and an upstanding left front flange 42 adapted to support the select cable 13. A longitudinally extending, vertically disposed center partition 43 extends rearwardly from the left side of the upstanding front flange 41. The housing 30 further supports a select cable crank lever 44, formed with a rearwardly extending leg 45 connected to an outboard end of a transverse dowel 46. The dowel 46 extends outward from a spherical ball member through a side aperture in the housing 30. The crank lever 44 has a downwardly extending leg, partially shown at 47, adapted for connection with the select cable 13 to provide crossover shifting of a manual transmission. Such conventional cable shifter structure is shown and described in the above mentioned LaRocca et al. patent the disclosure of which is incorporated by reference herein.

As seen in FIG. 1, the shifter 29 has a lower end pivotally connected to an annular-shaped cable end fitting 60 by means of a transversely extending pivot pin 62 received in a center through-hole of the end fitting. The cable end fitting 60, concentrically disposed about the axis of pin 62, is connected to the aft end of a shift cable rod 64 by an integral end fitting tubular portion 66 molded on the rod 64. A flexible cable core 65 connects the forward end of the rod 64 to a remote manual transmission.

The bellcrank lever 14 is shown in FIG. 6 mounted on the support structure base 25 by transverse pivot means, such as a transversely extending pivot shaft 67. The pivot shaft has a head end 68 journalled in hole 69 in side support 28 and its opposite end 70 journalled in hole 71 in the center partition 43. Principal axis "A" of the pivot shaft 67 is located a predetermined dimension forward of the shifter transversely extending axis 34 and below the shift cable assembly rod 64. As seen in FIG. 3, the bellcrank lever pivot shaft 67 has a pair of end bushings 72 received in circular holes in side wall portions 73 and 74 of the bellcrank lever 14.

FIG. 1 shows the bellcrank lever 14 pivoted to its forwardly biased reverse gear limit position wherein a vertical wallplate 79 of the lever arm 15 is positioned a predetermined dimension forward of the pivot axis "A". The bellcrank lever has a generally rectangular dish-shaped second arm 16, shown in FIG. 3 extending rearwardly from the pivot shaft 67. As seen in FIGS. 2, 4, and 5, the second arm 16 defines an upwardly facing, generally rectangular, concave semi-spherical surface raceway 82 having its center of curvature at the intersection of axes 34 and 36 coincident with the ball member of the ball and socket joint within the housing 30.

Figure 9:
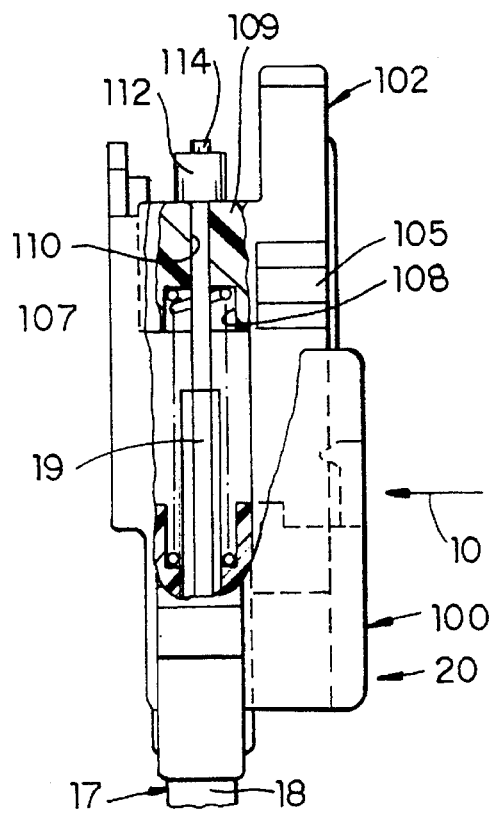
FIG. 9 is a front view of the interlock mechanism, with parts broken away, showing the interlock mechanism spring biasing the interlock slider upwardly to its key-release position.

With the ignition switch key cylinder 22 rotated to any non-Lock position, the cable core 19 is adapted to extend rearwardly, against a spring-loaded biasing force supplied by interlock mechanism internal spring, shown at 107 in FIG. 9. The cable core 19 is drawn-out rearwardly, from its FIG. 1 bellcrank lever forward limit position, against its interlock spring bias, as the shifter end fitting 60 travels rearwardly in frictional sliding contact on raceway 82. During its rearward travel, the fitting exerts a downward force on the raceway 82 which overrides the core spring bias causing the bellcrank lever to pivot in a clockwise direction about shaft axis "A". FIG. 2 shows cable core 19 at its full aft extension by virtue of the bellcrank lever 14 being pivoted to its clockwise aft rotational limit position, determined by the aft stroke of the shift cable rod 64.

As seen in FIG. 1, the bellcrank transverse pivot shaft axis "A" is positioned a predetermined dimension forward of the shifter transverse pivot shaft axis 36. As a result, the bellcrank 14 is rotationally biased in a counter-clockwise direction about its axis "A" by the spring loaded core 19. Accordingly, the raceway 82 is in constant spring biased engagement with the shifter end fitting 60 throughout the full shifting sequence.

With reference to FIG. 3 it will be seen that the semi-spherical concave raceway 82 provides five forward gear positions, 1, 2, 3, 4, and 5; a reverse gear position "R", and three neutral shift positions "N" arranged in a standard shift pattern. The longitudinal positions 1, "N", and 2 are arranged in a linear shift plane "X"; the positions 3, "N" and 4 in a linear shift plane "Y", and the positions 5, "N", and "R" in a linear shift plane "Z". The three neutral positions N are aligned in a neutral crossover path defined by "P". It will be noted in FIG. 1 that the reverse gear shifter position "R" is formed by raceway detent notch having an L-section.

As seen in FIG. 2, the reverse gear notch "R" is defined by a forward planar ramp portion 84 which intersects an aft planar portion 85 at an obtuse angle "D" of the order of 120 degrees. The reverse gear notch "R" is adapted to capture the end fitting 60 upon the shifter 29 moving the fitting in the shift plane "Z" to its extreme forward position about transverse axis 34. The obtuse ramp angle "D" reduces the mechanical load applied to the interlock cable core 19, upon the shifter 29 rotating the end fitting 60 against the reverse gear ramp portion 85 in the shift plane "Z".

As viewed in FIG. 1, the shifter assembly center partition 43 is shown supporting a conventional interlock cable tension adjuster 90. The cable core 19 is secured at one end to the ignition interlock mechanism 22 while its other end is secured to the bellcrank upstanding lever arm plate 16 upon the cable core 19 extending through the cable adjuster 90. The adjuster assembly 90 includes a tubular housing 91 fixedly secured to the center partition 43 as by integral clips (not shown). A disc-shaped spring seat 92 is formed on one end of an axially adjustable spring-loaded stem 93 of the assembly. A coil compression spring 94, which concentrically surrounds the stem 93, is adapted for axial compression adjustment between the stem spring seat 92 and an opposed annular spring seat 95 fixed on the housing 91. Upon the spring 94 being compressed to a selected cable core tension, a serrated slide 96 is moved transversely engaging a serrated portion of the stem 93 thereby locking the stem to the housing 91.

Initially the shifter end of the cable core 19 is fed through an axial bore of the stem 93 exiting a hole in the closed end of the housing 90. FIG. 6 shows the cable core 19 received in a vertical extending slot 97 in the upper edge of the bellcrank lever first arm wallplate 79 and held therein by an anchoring ferrule 98 crimped on the core free end.

Figure 7:
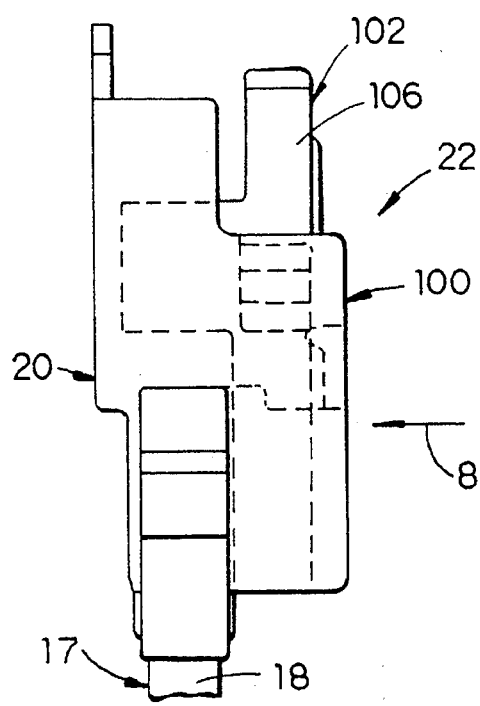
FIG. 7 is a front view of the interlock mechanism in its key-retain position wherein the unlocked spring-loaded slider allows the cable core to stroke in a push-pull manner over a predetermined range.
Figure 8:
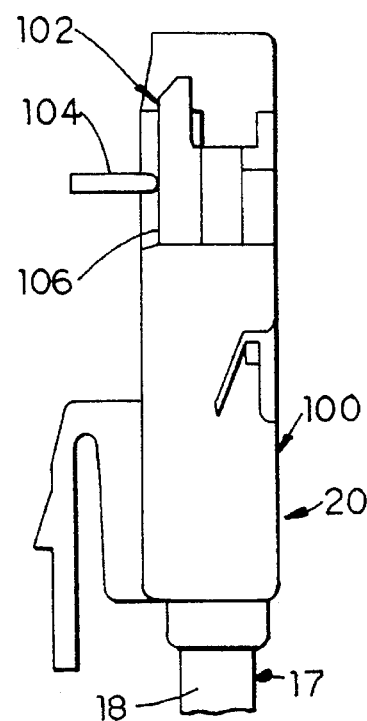
FIG. 8 is a side view of the interlock mechanism taken in the direction of arrow "8" in FIG. 7.

The key cylinder interlock mechanism 21, as seen in FIGS. 7 and 8, includes a housing 100 having a lock slider 102 positioned in its key-retain non-Lock mode wherein the key cannot be pulled out of the keyway 23. In the non-Lock mode, the interlock spring-loaded core 19 is free to stroke from its FIG. 1 forwardly contracted length, wherein the bellcrank lever is pivoted counter-clockwise to its forward limit position; to its FIG. 2 aft extended length, wherein the bellcrank lever is pivoted clockwise to its aft limit position. The interlock slider 102 allows the core 19 to stroke by virtue of cylinder spring-loaded pin 104 (FIG. 8) being urged into biased sliding contact with opposed slider surface 106. Thus, the interlock push-pull cable core 19 is spring-loaded by interlock helical coil compression spring, shown at 107 in a slider spring blind bore 108, allowing the shifter to move its end fitting or runner 60 between each of the raceway shift positions.

Figure 10:
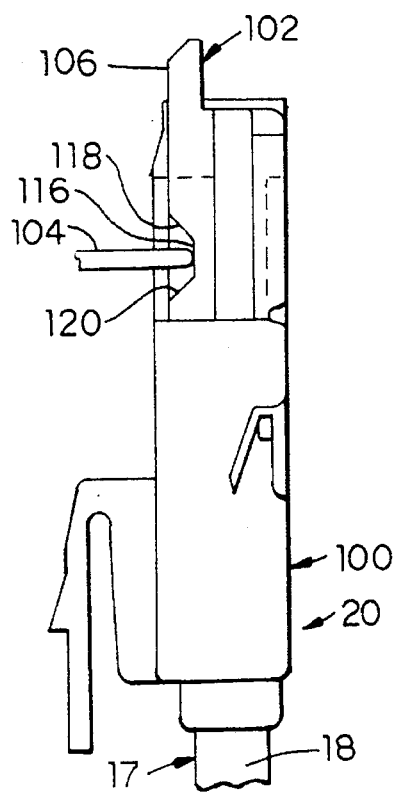
FIG. 10 is a side view of the interlock mechanism taken in the direction of arrow "10" in FIG. 9 with the slider locked by the key cylinder pin.
Figure 11:
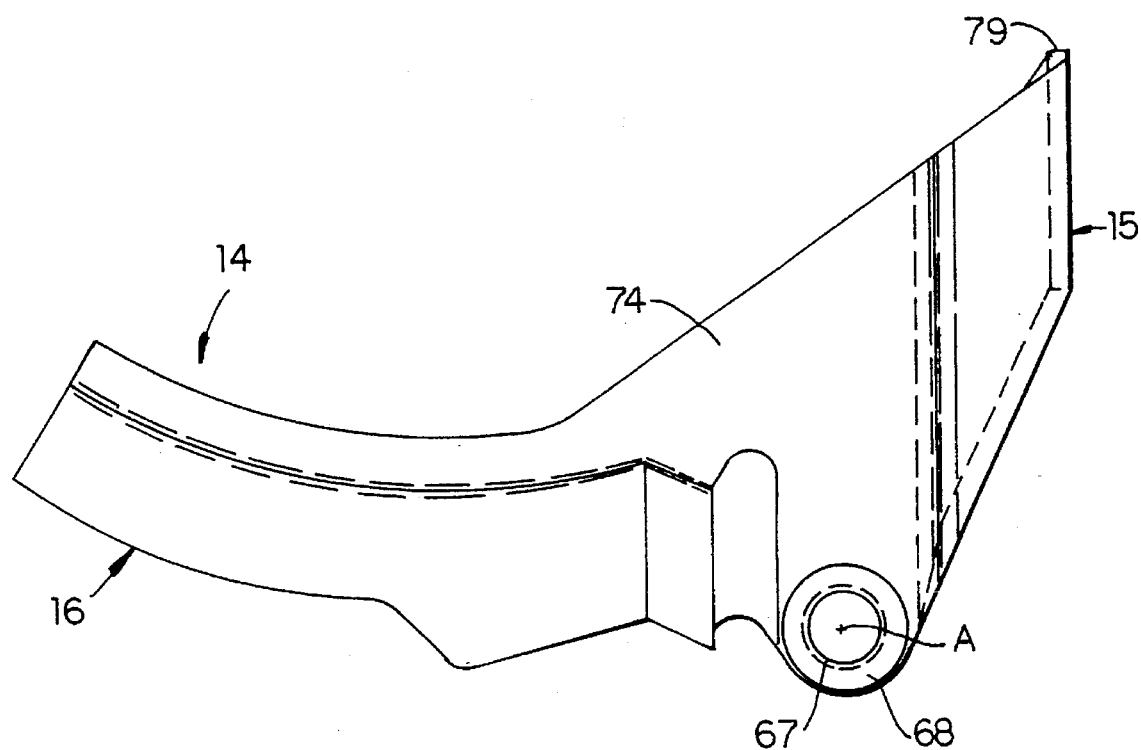
FIG. 11 is an enlarged detail side view of the bellcrank of the present invention taken in the direction of arrow "11" in FIG. 6.

With reference to FIGS. 9 and 10, the interlock mechanism slider 102 is shown in its key-release Lock mode wherein, with the end fitting 60 being captured in the reverse drive notch "R" the slider 102 is urged to its extended position by spring 107 (FIG. 9). FIG. 9 shows the cable core 19 having its one free end axially extending into the spring socket 108 of slider block portion 109, and thence through an aligned bore 110 for attachment by anchoring ferrule 112, crimped on core free end 114. It will be appreciated that with the slider 102 biased to its upwardly extended FIG. 9 position, slider locking pocket 116 receives the protruding spring-loaded locking pin 104. Unless the key cylinder is subsequently moved to its key-release Lock position, the locking pin 104 is adapted to be cammed inwardly to its FIG. 8 position by pocket ramp 118 of the slider 102 as the end fitting travels rearwardly on the raceway 82.

It will be understood that the present invention contemplates, in the case of a rigid shift rail type shifter, that a runner or follower member would replace the cable end fitting 60 of the disclosed embodiment.

While a preferred embodiment of the invention has been illustrated and described, this is only for the purposes of illustration. It is, therefore, to be understood that within the scope of the appended claims, the invention may be practiced otherwise than as specifically described.

What is claimed is:

1. An anti-theft gear shifter arrangement for a vehicle manual transmission comprising:

a shifter assembly including a base and an upper support, a shifter pivoted on said support for movement to drive and reverse gear positions, a bellcrank lever pivoted on said base for forward and aft movement about a transverse axis, said lever including an upstanding first arm and an aft extending second arm defining an upwardly facing semi-spherical raceway formed with a reverse gear position notch; and a key cylinder and interlock assembly arranged near said shifter, said cylinder being movable by a key between a key-retain non-Lock position and a key-release Lock position, a cable core having one end connected to a resiliently-biased interlock slider and its other end connected to an upper end of said first arm, and a runner on a lower end of said shifter;

whereby, with said cylinder in its non-Lock position, said runner adapted for longitudinal and transverse sliding travel on said raceway in response to said shifter being pivoted between a plurality of forward and reverse gear positions, during aft runner travel said core extending against said slider bias in response to said second arm being pivoted downwardly by said runner, and whereby during forward runner travel said core biases said first arm forwardly thereby maintaining said raceway in contact with said runner; and upon said shifter being shifted into said reverse gear position said runner is captured in said reverse notch and said core biases said first arm to a forward limit position such that, upon said cylinder being moved to its key-release Lock position, said runner is locked in said notch thereby preventing movement of said shifter, whereby the vehicle may be driven only in reverse gear.

2. The gear shifter arrangement as set forth in claim 1 wherein said shifter is pivoted on said support for rotation about longitudinal and transverse shifter axes, and wherein said bellcrank transverse axis is positioned orthogonal to said shifter longitudinal axis.

3. The anti-theft gear shifter arrangement as set forth in claim 2 wherein said bellcrank lever transverse pivot axis is positioned a predetermined dimension forward of said shifter transverse axis.

4. The anti-theft gear shifter arrangement as set forth in claim 2 wherein said semi-spherical raceway has a first radius of curvature in a longitudinal direction, determined by the runner path upon said gear shifter being rotated about its transverse pivot axis, and a second radius of curvature in the transverse direction, determined by the runner path upon said gear shifter being rotated about its longitudinal pivot axis.

5. The anti-theft gear shifter arrangement as set forth in claim 2 wherein said shifter assembly is a cable shifter assembly and said shifter lower end runner is a cable end fitting, and a longitudinally extending shift cable is adapted for interconnecting said shifter cable end fitting with a manual transmission.

6. The anti-theft gear shifter arrangement as set forth in claim 5 wherein said bellcrank forward and aft limit positions are defined by the respective forward and aft travel of said shifter cable.

7. The anti-theft gear shifter arrangement as set forth in claim 1 wherein said raceway reverse gear notch, in longitudinal section, is in the form of an L-section obtuse angle notch including angularly disposed forward and aft planar ramp portions.

8. The anti-theft gear shifter arrangement as set forth in claim 7 wherein said obtuse angle is of the order of 120 degrees.

9. The anti-theft gear shifter arrangement as set forth in claim 1 wherein said reverse gear position notch is positioned adjacent to and aft of said bellcrank transverse axis.

10. The anti-theft gear shifter arrangement as set forth in claim 1 wherein said key cylinder and interlock mechanism assembly is mounted on the vehicle steering column.

* * * * *